United States Patent [19]

Zatorre

[11] 4,339,971
[45] Jul. 20, 1982

[54] FASTENER AND DRIVING TOOL

[76] Inventor: Alfredo E. Zatorre, One Crescent Dr., Salem, Mass. 01970

[21] Appl. No.: 115,956

[22] Filed: Jan. 28, 1980

Related U.S. Application Data

[63] Continuation of Ser. No. 969,013, Dec. 13, 1978, abandoned.

[51] Int. Cl.³ .................. B25B 15/02; B25B 23/08
[52] U.S. Cl. .................. 81/436; 81/460; 81/461; 81/441
[58] Field of Search .............. 81/436, 437, 439, 441, 81/442, 443, 444, 445, 449, 450, 451, 452, 453, 459, 460, 461

[56] References Cited

U.S. PATENT DOCUMENTS

| | | | |
|---|---|---|---|
| 52,631 | 2/1866 | Weaver | 81/436 |
| 132,946 | 11/1872 | Armstrong . | |
| 449,037 | 3/1891 | Chapman . | |
| 671,284 | 4/1901 | Kummero . | |
| 685,197 | 10/1901 | Barnes . | |
| 697,836 | 4/1902 | Gorham . | |
| 1,055,031 | 3/1913 | Groos . | |
| 1,056,095 | 3/1913 | Groos | 81/436 |
| 1,366,341 | 1/1921 | Anderson . | |
| 1,411,242 | 3/1922 | Faust | 81/436 |
| 1,448,392 | 3/1923 | Earnshaw . | |
| 1,453,913 | 5/1923 | Burdick . | |
| 1,758,945 | 5/1930 | Grube . | |
| 1,797,390 | 3/1931 | Wood . | |
| 1,899,489 | 2/1933 | Wickberg . | |
| 1,997,422 | 4/1935 | Lorenzen et al. . | |
| 2,276,091 | 3/1942 | Reppert . | |
| 2,301,590 | 11/1942 | Signorelli . | |
| 2,304,704 | 12/1942 | O'Leary . | |
| 2,366,682 | 1/1941 | West | 81/460 |
| 2,566,055 | 8/1951 | Daderko et al. | 81/436 |
| 2,684,094 | 7/1954 | Lissy | 81/436 |
| 3,463,209 | 8/1969 | Podolsky . | |
| 3,575,080 | 4/1971 | Hannay . | |
| 3,695,321 | 10/1972 | Garehime | 81/461 |
| 3,897,812 | 8/1975 | Arnn . | |
| 3,923,088 | 12/1975 | Arnn | 81/436 |
| 4,016,912 | 4/1977 | St. Amour . | |
| 4,078,593 | 3/1978 | Benitz . | |
| 4,105,056 | 8/1978 | Arnn | 81/436 |
| 4,130,152 | 12/1978 | Bolen | 81/451 |
| 4,190,091 | 2/1980 | Colognori | 81/436 |

FOREIGN PATENT DOCUMENTS

| | | | |
|---|---|---|---|
| 10612 | 1/1880 | Fed. Rep. of Germany | 81/436 |
| 362860 | 11/1922 | Fed. Rep. of Germany . | |
| 2338412 | 8/1978 | France | 81/436 |
| 22718 | of 1910 | United Kingdom . | |
| 607299 | 8/1948 | United Kingdom | 81/436 |

Primary Examiner—Donald R. Schran
Attorney, Agent, or Firm—Dahlen & Gatewood

[57] ABSTRACT

A driving tool and fastener, in the driving end of which is provided a nick or slot for insertion of the driving tool for driving the fastener, are provided which, because of their particular, respective cross-sectional configurations, can be interlocked temporarily together. As this interlocking engagement prevents the driving tool from accidentally slipping from the nick in the driving end of the fastener, rotational movement of the fastener is greatly facilitated. The shank of the driving tool is provided at its operative end with a bit that, because of its cross-sectional configuration compared to that of the nick, wedges with the nick. Thus, not only is slipping between the driving tool and fastener prevented when rotating the fastener, but accidental separation of the driving tool from the fastener is prevented, making the task considerably easier when using the fastener in overhead work or in a hard to reach location.

9 Claims, 5 Drawing Figures

U.S. Patent  Jul. 20, 1982  4,339,971
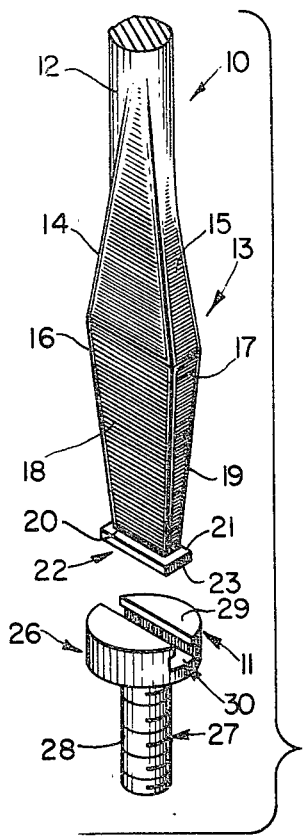
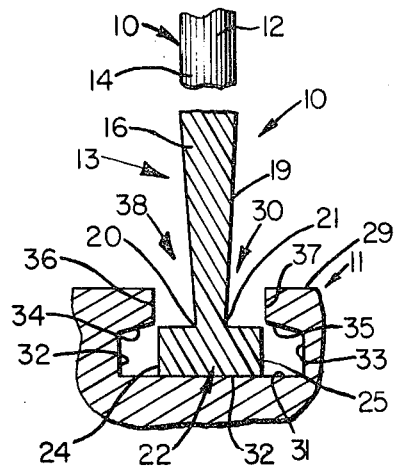
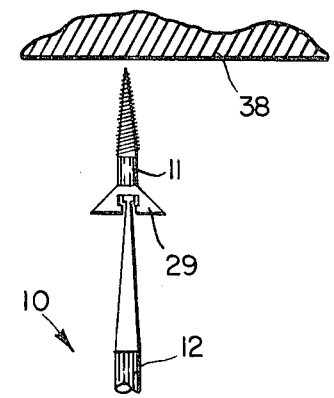
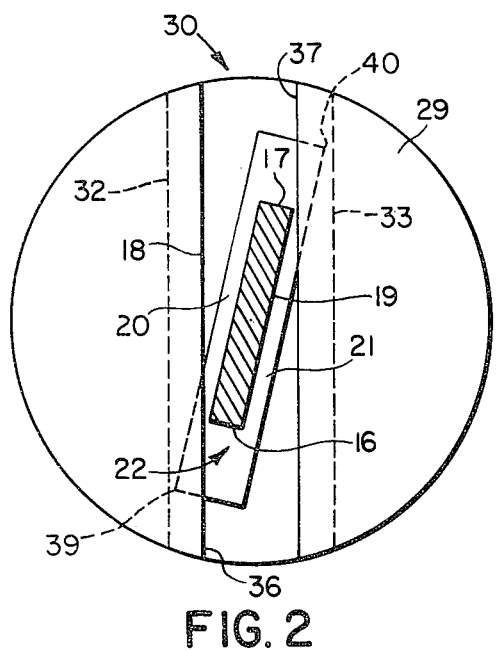
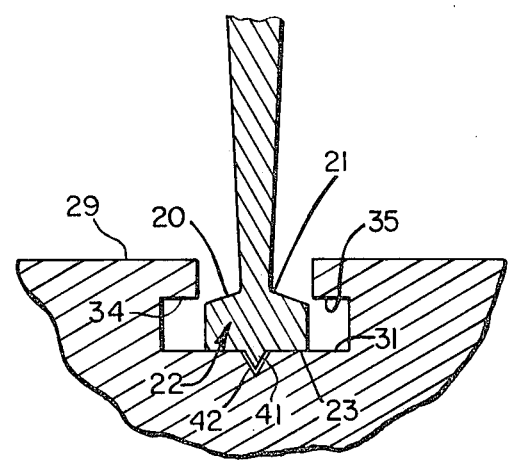

FASTENER AND DRIVING TOOL

This is a continuation of application Ser. No. 969,013 filed Dec. 13, 1978 now abandoned.

BACKGROUND OF THE INVENTION

1. Field of Invention

The present invention is concerned broadly with a driving tool for providing rotational motion to a fastener or the like, and to the particular fastener for use in combination with the driving tool. In its more particular aspects, the invention is concerned with a threaded fastener such as a screw and the driving tool to drive or withdraw such a fastener.

2. Description of the Prior Art

Those using screwdrivers of ordinary construction, e.g., a blade whose bottom is flat and comprising converging planar side faces terminating at the flat bottom, are accustomed to the driver slipping out of the nick in the head of the screw particularly when the nick in the screw is a conventionally shaped nick or slot and the screw is somewhat difficult to turn, as during the last few turns in driving the screw into a workpiece or in starting the screw in taking it out, and especially if the nick or groove of the screw, or the tip of the screwdriver, is in the least bit worn.

As a result of this slippage the greater part of the force exerted in screwing a screw in or out is often expended in maintaining the screwdriver in engagement with the screw. Unless axial pressure, and sometimes very great pressure, is applied to the screwdriver, its operating end may repeatedly slip out over the walls of the nick or groove in the screw head, involving not only a loss of time and energy in re-applying the screwdriver to the screw, but increasing the probability of injury to an operator's hands and fingers.

Oftentimes the surface of the material containing the screw is scratched and marred by the slipping of the screwdriver blade. These difficulties with screwdriver slippage become quite serious in some cases, e.g., working with finished hard wood constructions, as the slippage of the screwdriver results in scratches or disfigurement, which cannot be readily removed, if at all.

Moreover, after a screwdriver has once slipped from the nick of a screw, it becomes more difficult to prevent its recurrence, owing to the fact that the edge of the nick becomes somewhat rounded off and offers less resistance to slippage. The more times the blade slips, the more rounded the nick walls become, making it even more difficult to screw or unscrew the screw. This is particularly a noticeable problem in the case of soft metal screws, e.g., screws of brass, aluminum, copper, etc.

In certain uses, e.g., in overhead work and in placing screws in vertical locations, it is also most difficult to start a screw with the ordinary screwdriver. This is because the screwdriver and screw are separate and distinct from one another and in no way are fastened together. The particular location, moreover, may prevent an operator, in starting the screw into the work, from properly holding the screw in his one hand while operating the driving tool with the other. As a result, the screw may be repeatedly dropped, requiring repeated reapplication and making for a more difficult, tiring, frustrating, and time consuming operation. This is particularly bothersome when the operator may be on a ladder. In this case, if the operator is a home owner, he may have to descend the ladder to locate the screw. Sometimes the screw cannot be readily located and is even lost. If the operator is involved in an industrial operation, the fallen screw is not ordinarily retrieved; the operator merely takes another screw from his supply. The fallen screw may eventually be swept away, but meanwhile it sometimes presents an unsafe condition, and like the proverbial banana peel can result in a slip and fall injury if someone steps on it.

Over the years, various screwdrivers and screws have been devised as a solution to the problems pointed out above, as exemplified in U.S. Pat. Nos. 132,946; 685,197; 1,055,031; 1,056,095; 1,366,341; 1,797,390; 1,997,422; 2,301,590; 3,923,088; 4,016,912; and 4,078,593. In U.S. Pat. No. 132,946, there is disclosed a screw in which an undercut nick is provided in the screw head, and in which the nick widens from the center to the head circumference. The screwdriver for the screw has a blade made of two parts for being wedged into the nick from each end to the center of the screw. Thus, the screw is fastened to the end of the driver facilitating presentation of the screw in overhead work.

The invention disclosed in U.S. Pat. Nos. 685,197; 1,055,031; and 1,056,095 are to improved screwdrivers. In the first patent, the invention comprises a screwdriver in which the blade portion entering the nick or groove of the screw is provided with projections extending laterally in opposite directions. These projections, as disclosed by the patentee, are to be sufficiently sharp so that they bite into the walls of the nick on opposite sides, preventing the screwdriver from slipping out of the nick. The terminal portion of the screwdriver in U.S. Pat. Nos. 1,055,031; and 1,056,095 is provided with grooves that increase in depth and width from the center to the edge of the blade. Thus, a sharp point or tooth is provided for engaging the wall of the nick in the screw head. As shown in U.S. Pat. No. 1,056,095, such a screwdriver can be used in conjunction with a screw in the head of which is provided a nick or groove having overhanging or beveled sides.

U.S. Pat. No. 1,366,341 discloses a screw the head of which is provided with a nick which can be of dove-tail configuration. The screwdriver blade tip is of complementary configuration and is provided with a longitudinal slidable shell that engages the screw head, locking the screwdriver in combination with the screw.

In U.S. Pat. No. 1,797,390, there is disclosed a screwdriver designed to be keyed on a screw. As shown in that patent, the bit of the driver is provided with a key that intrudes into a longitudinal slot in the screw, thereby centering the screwdriver in the nick or the cross slot of the screw. The driver bit tapers laterally from the key to the outer edges of the blade enabling easy access of the bit in the cross-slot while the driving tool is revolved.

U.S. Pat. No. 1,997,422 discloses a screw and screwdriver permitting interlocking engagement between the two. The screw head is provided with a slot that is bigger at the bottom than at the top. Thus, when the screwdriver is inserted into the end of the slot and aligned, its bit, being of a complementary shape, is prevented from accidental disengagement.

U.S. Pat. No. 2,301,590 shows a screwdriver whose bit comprises two resilient beveled members. After the two beveled members are engaged with the dove-tail shaped slot in the associated screw, the shanks associated with the beveled members are operated to make them inflexible whereby the beveled members are interlocked with the screw.

In U.S. Pat. No. 3,923,088, there is disclosed a biting screwdriver having a foot portion on the lower extremity of its blade for increasing the effectiveness of the blade in gripping the side walls of a screw nick or slot. The driver is used with conventional screws having a nick comprising planar, parallel, vertical, spaced-apart walls.

U.S. Pat. No. 4,016,912 discloses a screwdriver for slotted-head screws in which the screwdriver bit is provided with protuberances on opposite sides thereof to engage the walls of a dull or deformed slot of a slotted-head screw, to hold the screwdriver against undesirable shifting lengthwise of the slot in screwing and unscrewing the screw.

In U.S. Pat. No. 4,078,593 there is disclosed a screwdriver comprising a shank comprising two elements and a slide mechanism. The slide mechanism acts to expand and contract the shank elements to thicken and thin the screwdriver blade formed by the tips of the shank elements, as desired. Thus, screw slots can be more readily engaged, particularly if a portion of the slot is occluded.

While the various screwdrivers and associated screws as disclosed in the above patents may provide satisfactory performance to a certain degree, their apparent lack of commercial availability would seem to indicate their performance is not totally satisfactory. This may be due not only to the rather complicated nature of certain of the driving tools, but also to a variety of other reasons. In many instances, the driver bits and screw configuration do not really provide for satisfactory interlocking engagement. This is due to the fact that in many instances the nick and bit are of complementary cross-section. Thus, this "mating configuration", does not really permit a wedging of one with the other to occur. In other instances the sharp edge provided on the foot of the driver blade does not actually cut into the side wall of the nick, and when no cut is made into the side wall, no interlock can really be provided. Even when a cut is made in a nick side wall, there is really no interlocking engagement between the screwdriver and screw as they are easily separated. In some cases the driver has to be inserted into the screw nick from the edge of the screw; or has to be manipulated from the vertical to gain entry to the nick, or to be retracted from it. Thus, some of the driving tools cannot be used at all with countersunk holes.

SUMMARY OF THE INVENTION

There is provided in accordance with the more basic aspects of my invention a driving tool for providing a torque to rotatably move an elongated member, for example, an elongated fastener, the elongated member being provided in its one end, the driving end, with a transverse nick or slot of a generally inverted T cross-sectional configuration. The driving tool in its more basic aspects comprises a bit for association with the nick in the elongated member, the nick and bit being of such a non-complementary cross-sectional configuration that on rotation of the driving tool with respect to the elongated member, when the two are in association with one another, the two are wedged together in positive, temporary, interlocking relationship with one another.

In the more specific and preferred aspects of the invention, the elongated member is a slotted fastener having screw threads along at least a part of its length, and the associated driving tool for screwing the fastener into and out of a workpiece provides a driving tool and screw fastener not attendant with the problems of such prior art devices as set forth above.

The driving tool and threaded fastener of the invention are simple in construction, can be manufactured according to conventional techniques, and are easy to use. Their respective constructional configuaration provide for positive interlocking engagement between the two not only preventing slippage of the driving tool from the fastener during the screwing and unscrewing, but positive temporary engagement of the driving tool with the fastener, prior to presention of the screw to the workpiece and after the screw is fully unscrewed. Thus, quite advantageously, this positive but temporary interlocking engagement allows the presentation of the fastener to the workpiece in any position, including overhead, without the fastener falling off the driving tool and with it in proper alignment. Also, the advantageous temporary interlocking engagement allows removal of the screw fastener from a workpiece in any position without the fastener being accidently dropped.

Quite advantageously the operative end of the driving tool and fastener nick according to the invention are of such corresponding construction that the driving tool fits into the nick or slot in the driving end of the fastener with a straight axial motion, even though the fastener driving end is recessed into a counterbored hole.

While the driving tool and screw fastener in the preferred aspects of the invention are desirably used as a combination, it will be appreciated that this need not always be the case. Though less desirable, the fastener can be driven into or out of work by means of a conventional driving tool such as the ordinary screwdriver.

In its more basic aspects, the preferred fastener according to the invention comprises an elongated cylindrical shaped member or shaft, the shaft being provided along at least a part of its length with a threaded portion, and in the top surface of its driving end with an inverted generally T-shaped nick or slot extending diametrically from edge to edge in the fastener driving end, said inverted T-shaped nick comprising a planar bottom surface defining substantially a rectangle of a predetermined width, a first pair of parallel, spaced apart, sidewalls extending upwardly from the planar bottom, an upper surface extending inwardly and slightly upwardly toward one another from each said side wall, and a second pair of spaced apart parallel side walls extending vertically upwardly from said upper surfaces and terminating at said top surface of the said fastener driving end, leaving the nick open at the top for axial insertion of the bit of the driving tool.

The preferred driving tool of the invention for association with the screw fastener in its more basic aspects comprises a shank having an inverted generally T-shaped blade at its operative end for association with the inverted generally T-shaped nick in the fastener driving end, said T-shaped blade comprising a bit comprising a planar bottom surface defining a rectangle of predetermined width, parallel spaced apart planar sides extending upwardly from said planar bottom surface, an upper planar surface extending inwardly from each said side and parallel to the bottom surface, and opposed spaced apart planar faces converging generally toward one another terminating at, and integral with, a respective upper surface of the bit.

BRIEF DESCRIPTION OF THE DRAWINGS

The features of the invention will be better understood by reference to the accompanying drawings in connection with reading this specification in which:

FIG. 1 is a perspective exploded view of the driving tool and a slotted fastener or the like according to the invention;

FIG. 2 is a plan view of the fastener shown in FIG. 1, showing the bit of the driving tool in operative position for rotating the fastener clockwise;

FIG. 3 is a side view in cross-section taken down the center line of the combination shown in FIG. 1, showing the ability of the driving tool to be axially inserted into the nick of the fastener;

FIG. 4 is a view in perspective showing the driving tool and a threaded fastener such as a screw, in, interlocking engagement prior to screwing the fastener into overhead work; and FIG. 5 is a view in cross-section showing an alternative embodiment of the driving tool and fastener, according to the invention.

DETAILED DESCRIPTION OF THE INVENTION AND THE PREFERRED EMBODIMENTS

Referring now to the drawing, there is shown in FIG. 1 thereof a driving tool 10 in combination with a threaded fastener 11 in accordance with the invention. Driving tool 10 comprises a cylindrical shaped shank 12 terminating at the operative end thereof in a blade 13. As shown in the drawing, blade 13 comprises generally outwardly or diverging portions 14,15 and generally converging planar side edges 16,17. Blade 13 also comprises opposed converging planar faces 18, 19 terminating at the planar top surfaces 20,21 of bit 22. These planar top surfaces, as shown in the drawing, extend some distance beyond side edges 16,17, for a purpose which if not already obvious will later be more fully explained.

As is shown more clearly in FIG. 3 of the drawing bit 22 comprises a planar bottom surface 23 defining a rectangular shape and has spaced apart planar parallel side walls 24,25 extending upwardly there from. These sidewalls 24,25 are joined respectively to planar top surfaces 20,21 which extend inwardly toward one another in the same plane and parallel to bottom surface 23, joining with the respective bases of converging planar faces 18,19. As can be seen from the drawing, blade 13 is of a symmetrical generally inverted T-shaped cross-section, an imaginary plane extending down the length of shaft 12 dividing planar bottom 23 into two equal portions.

Threaded fastener 11 comprises a driving end which in this case comprises head 26, and a shaft 27 provided with threads 28, at least partially along its length. It will be appreciated, however, that threaded fastener 11 need not comprise a head as shown in the drawing. The fastener may be, for example, a threaded set screw in which case the driving end is headless. A nick in such a fastener is provided in its top planar surface transverse to the axial length and, if desired, threads can be provided along the entire length as is conventionally done in set screws. Head 26 as shown in the drawing is provided with a conventional planar circular shaped top surface 29 in which is provided a nick or slot 30 of an inverted generally T-shaped cross-section extending diametrically from one edge to the other of the screw head. Nick 30 comprises a planar bottom 31 of substantially rectangular shape as shown in FIG. 2 of the drawing, and has spaced apart planar parallel side walls 32,33 extending vertically upwardly therefrom, as shown in FIG. 3. Side walls 32,33 terminate in respective upper surfaces 34,35 which extend inwardly toward one another and slightly upwardly. From the respective ends of upper surfaces 34,35, extend in vertical fashion spaced apart parallel side walls 36,37. These side walls terminate at top surface 29 in screw head 26, providing substantially a rectangular shaped opening 38. The width of this opening must be sufficient to allow insertion of bit 22 into nick 30 in an axial movement of driving tool 10. As shown in the drawing, particularly FIG. 3, nick 30 is of symmetrical cross-section.

The end of shank 12 of driving tool 10 opposite the operative end can be provided with any of various handles such as is commonly provided on screwdrivers. (See FIG. 4) It can also be provided with various conventional configurations allowing the driving tool 10 to be used with a power unit such as a drill. It will be appreciated that, although shank 12 is shown to be of cylindrical configuration, it can be of other cross-section as desired, e.g., square or hexagonal.

In using the driving tool of the invention as shown in FIG. 1, prior to screwing fastener 11 into a hole, one holds the fastener 11 in one hand and simply inserts the bit 22 into the nick 30 of the fastener in an axial motion, as in presenting any conventional screwdriver to a regular screw head slot or nick. The driving tool 10 is then rotated clockwise (FIG. 2) or, the fastener can be rotated counter-clockwise, while maintaining the tool steady.

The natural stop of this rotation occurs when corners 39 and 40 of top surfaces 20,21, respectively, come into jamming contact with upper surfaces 34 and 35 of the nick or slot 30. Due to the small area provided by the point contact of these two corners, only a little force resulting from the torque produces high pressure, a pressure sufficient to produce a slight elastic compression of the corners 39,40, assuring the wedging action of the driver with the fastener and a positive temporary interlocking engagement between the two. This wedging action results from the fact that, as shown in the drawing (FIG. 3) these surfaces are not complementary, e.g. a chamferred surfaces (surface 34 and 35) wedges with a planar horizontal surface (surfaces 20 and 21), respectively.

While the design of blade 13, as will be appreciated, need not be of the particular construction shown in the preferred embodiment of the invention, it is of critical importance that its design be such that surfaces 18,19 thereof never be in contact with surfaces 36,37, respectively of nick 30, so as to assure contact of upper surfaces 20,21, in particular corners 39,40, with upper surface 34,35. Moreover, it is critical that the respective design and dimensions of bit 22 and nick 30 be such that wedging occur leaving a space as shown between bit 22 and surfaces 32,33.

It will be appreciated that the respective dimensions of bit 22 and nick 30 can be varied somewhat, provided the desired wedging or jamming action is obtained. The upper surfaces 20,21 of bit 22 should extend beyond blade edges 16,17 sufficiently to allow portions thereof, as indicated in FIG. 2 of the drawing, to enter the grooves formed by overhanging top surfaces 34,35 and bottom 31 of the nick, to provide suitable wedging action.

Thus, the driving tool 10 can be temporarily and positively interlocked with fastener 11, although the fastener may not yet be in contact with the workpiece, to prevent accidental separation of the tool 10 and fastener 11, and allowing the insertion of the fastener into the work in any direction, including overhead, with the fastener in the desired orientation. See, for example, FIG. 4. When the fastener 11 is fully screwed into the work, as in the overhead work 38 in FIG. 4, a slight counter-clockwise torque will free the tool from the fastener, and on aligning the cross-bar of the inverted T-shaped bit with the opening in the nick of the fastener, the driving tool can be retracted from the fastener in axial direction.

The jamming action between the driving tool 10 and fastener 11 can also be obtained when a counter-clockwise torque is applied to a threaded fastener that has been screwed into a work piece. The axial movement in inserting or withdrawing the driving tool allows use of the driving tool even though the fastener is positioned inside a deep counterbored hole.

The wedging or jamming action between the driving tool and fastener prevents slippage of the driving tool in the nick of the fastener. This action becomes even more positive as the torque increases, due to the mechanical effect of the wedge. Thus, as the fastener reaches its final position, on screwing into a work piece, the chances of slippage are decreased with a driving tool according to the invention, as the torque needed to secure the screw increases. Nevertheless, the driver and fastener can be easily disengaged by a slight rotation in the opposite direction.

The same increased wedging action applies when screwing out a threaded fastener since at the beginning of the operation, the highest torque is applied. Thus, when resistance to slippage is most needed, the driving tool and screw according to the invention provides this most effectively.

As will be appreciated, the wedging action according to the invention can be accomplished with bits and nicks of somewhat different cross-sectional configuration than that shown in FIG. 3. Thus, the top surfaces 20,21 of bit 22 can be slanted upwardly, instead, with respect to bottom 23, while top surfaces 34,35 of nick 30 are provided parallel to bottom 31, as shown in FIG. 5 of the drawing. On the top surfaces of the bit and the nick can both be chamferred, but the top surfaces of the nick be chamferred at a slightly different angle to allow for the wedging action. The respective side walls needs not be planar or vertical, or do they have to be parallel to one another. These are primarily matters of choice making for ease in manufacture. While in the desired and most preferred embodiment of the inventions bottom surfaces 23 and 31 are planar, they need not be of this configuration. The main thing is that these surfaces mate so as not to preclude rotational movement of the fastener with respect to the driving tool.

The driving tool 10 and fastener 11 can, moreover, be provided with corresponding means to key the driver onto the screw, if desired. Thus, as shown in FIG. 5 of the drawing, bit 22 of driving tool 10 can be provided with a centrally located conical shaped protrusion 41 depending from its bottom surface 23. Protrusion 41, as shown, keys with a centrally located conical shaped depression 42 in bottom surface 31 of the fastener, providing the two members in axial alignment with one another then prior to rotation.

It will also be appreciated that while the cross-section of the nick in the fastening means is of an inverted generally T-shaped cross-section, the bit of the driving means need not be of the same cross-sectional configuration. The inventive concept is broadly that the upper surfaces of driving bit 22 wedge with the upper overhanging surfaces of nick 30. As shown in FIG. 2 of the drawing, the upper surfaces on opposite sides of the driving tool blade 13 wedge with only adjacent opposite upper surfaces of the nick 30. Thus, although providing a somewhat less desirable tool for general usage the driving tool can have a bit of reversed L-shaped cross-section, at each edge, if desired. This manner of driving tool will find utility in power tools used in industrial application, e.g. in assembly lines, when fasteners need be driven in. The reversed L-shaped cross-section, moreover, provides a quick and easy removal of the tool from the nick, an important feature in assembly line operations. However, as such a driving tool will operate only to drive the threaded fastener into the work, it will be necessary to provide an additional tool in which the blade is of L-shaped cross-sectional configuration at opposite edges to remove the threaded fastener. With either of these single function tools, the bit portion, i.e., the base of the L, protruding from opposite sides of the blade can be widest at the blade edges, tapering toward the center line of the tool.

The threaded fastener in the preferred embodiment of the invention can take various forms; it can be flat or round headed, e.g., wood screws, machine screws, and lag screws. The heads can be circular or polygonal. The fasteners can be headless, also. As pointed out earlier, the invention is really not limited to a threaded fastener; it can be practiced with any piece part in which a slot can be provided in one end, the driving end, for insertion of a driving tool according to the invention for rotation.

The driver and fastener of the invention can be made, as will be appreciated, according to various techniques already known. One such technique is by means of various machining operations, for example, milling and broaching. The nick in the driving end e.g., can be cut into the driving end in stages, as desired. However, cold heading or forming techniques can also be used, especially for manufacturing the driver.

The materials of construction of the driving tool and fastener or the like can vary widely; however, a high quality steel is most preferred. However, it will be appreciated that the fasteners, in particular, can be made also from soft metals such as brass, bronze, aluminum, etc., or even plastic.

As many different embodiments of this invention will now have occurred to those skilled in the art, it is to be understood that the specific embodiments of the invention as presented herein are intended by way of illustration only and are not limiting on the invention, but that the limitations thereon can be determined only from the appended claims.

What I claim is:

1. Combination elongated member and driving tool for providing rotational motion to said elongated member, said elongated member comprising a shaft, a driving end on said shaft and a top surface on said driving end, a nick in the top surface of said driving end extending transversely to said shaft, said nick comprising a horizontally disposed bottom defining a substantially rectangular shape of predetermined lesser width than the said top surface, spaced-apart sidewalls extending upwardly from said horizontally disposed bottom, an upper surface overhanging said bottom and extending from each said sidewall inwardly and toward each other, at a first predetermined angle relative to each sidewall, and parallel, spaced-apart walls extending vertically upwardly from the end of each said overhanging upper surface and terminating at said top surface thereby defining a substantially rectangular shaped opening of predetermined lesser width than said rectangular shaped bottom; and a driving tool comprising a shank having an operative end for association with the said elongated member and located in said nick, said operative end of the shank comprising a blade of generally an inverted T-shaped cross-section, said blade comprising a bit comprising a bottom surface defining a rectangular shape of predetermined lesser width than the width of the rectangular shaped opening in said elongated member whereby said driving tool can be inserted axially into the nick in the said elongated member, spaced-apart sidewalls extending upwardly from said bottom surface, and top surfaces extending inwardly toward one another from respective sidewalls at a second predetermined angle, the blade being further defined by planar faces and edges converging toward one another and terminating at said top surfaces of the bit, said top surfaces defining an area extending beyond said converging planar faces and edges and the second predetermined angle of said top surfaces being non-complementary with respect to the said first predetermined angle of the respective upper surfaces of the nick, the vertical dimensions of the bit with respect to the vertical location of the said overhanging upper surfaces being such as to permit diagonally opposite portions of the top surfaces of the bit, on operative association of the driving tool with the elongated member, to pass under and into jamming contact with the diagonally opposite, non-complementary, overhanging upper surfaces of the nick whereby the driving tool is temporarily interlocked with the said elongated member in wedging engagement and the elongated member can be presented to or withdrawn from a work piece in any desired orientation and without becoming accidentally separated from the driving too.

2. Combination elongated member and driving tool for providing rotational motion to said elongated member according to claim 1 wherein the upper overhanging surfaces of the nick are planar and diverge slightly upwardly with respect to the horizontally disposed bottom, and the top surfaces of the bit are planar and in the same horizontally disposed plane.

3. Combination elongated member and driving tool for providing rotational motion to said elongated member according to claim 2 wherein the said horizontally disposed bottom and bottom surface are both planar and the top surfaces of the bit are in a plane parallel to the said bottom surface.

4. Combination elongated member and driving tool for providing rotational motion to said elongated member according to claim 1 wherein means are provided on the bottom of the nick and the bottom surface of the bit for keying the driving tool relative to the elongated member thereby providing them in axial alignment with one another.

5. Combination elongated member and driving tool for providing rotational motion to said elongated member according to claim 4 wherein the means provided on the bottom surface of the bit is a centrally located conical shaped protrusion that extends from the bottom surface of the bit and the means provided on the bottom surface of the nick is a centrally located conical shaped depression.

6. Fastener and driving tool for association with and for providing rotational motion to the fastener comprising:

(a) a fastener comprising a shaft, a driving end at one end of the shaft and a top surface on the driving end transverse to the length of the shaft, a nick of generally inverted T-shaped cross-section located in the top surface of said driving end and extending transversely to said shaft, said nick comprising a horizontally disposed planar bottom defining a substantially rectangular shape of predetermined width, a pair of spaced-apart, parallel sidewalls extending vertically upwardly from said planar bottom, a planar upper surface extending inwardly from each said sidewall in said pair of sidewalls, each said upper surface diverging slightly upwardly with respect to the said planar bottom and providing symmetrical overhangs with respect to the planar bottom, parallel, spaced-apart sidewalls extending vertically upwardly from said planar, upper, overhanging surfaces terminating at said top surface in the driving end of the shaft and defining a substantially rectangular shaped opening in the said top surface of the shaft of a predetermined lesser width than the said rectangular shaped bottom; and (b) a driving tool comprising a shank having an operative end for association with the said fastener and a driven end, a blade at the operative end of the shank of generally an inverted T-shaped cross-section for operative association with the nick of generally inverted T-shaped cross-section in the fastener, said blade comprising a bit comprising a planar bottom surface defining a rectangular shape of predetermined lesser width than the width of said rectangular shaped opening in said fastener top surface thereby allowing axial insertion of the bit into the said nick, spaced-apart, parallel, planar sides extending vertically upwardly from said planar bottom surface, and a planar top surface extending inwardly from each said side in the same plane parallel to said planar bottom surface, and said blade further being defined by planar faces and side edges converging toward one another and terminating at said top surface of the said bit, the top surfaces of the bit extending beyond said converging side edges and defining a rectangular surface of greater width than defined by the said converging planar sides of the blade, the intersection of each said top surface and its respective sidewall defining a sharp point at the extremities of the said intersection, the dimensions of the bit vertically being such with respect to the vertical location of the nick overhangs that, on operative association of the blade with the nick, the bottom of the nick in contact with the bottom surface of the bit, and on rotation of the driving tool with respect to the fastener, sharp points located diagonally with respect to one another jam with respective upper diverging overhanging surfaces of the said nick and provide temporary, wedging engagement between the driving tool and fastener, whereby the fastener can be presented to or withdrawn from a workpiece in any desired orientation and without becoming accidentally separated from the driving tool.

7. Fastener and driving tool for providing rotational motion to the fastener according to claim 6 wherein the fastener further comprises a head of somewhat greater lateral dimension than the shaft and the nick in the fastener is provided in the top surface of the head of the fastener.

8. Fastener and driving tool for providing rotational motion to the fastener according to claim 6 wherein the fastener is a threaded fastener and suitable threads are provided on the shaft thereof.

9. Fastener and driving tool for providing rotational motion to the fastener comprising:

(a) a fastener comprising a shaft, a driving end at one end of the shaft for association with the driving tool and a top surface in said driving end, a nick of generally an inverted T-shaped cross-section located in said top surface of the driving end and extending transversely across said shaft, said nick comprising a horizontally disposed planar bottom defining a substantially rectangular shape of predetermined width, spaced-apart, parallel sidewalls extending vertically upwardly from said planar bottom, planar upper surfaces extending in the same horizontal plane inwardly toward one another from the said sidewalls and providing overhanging surfaces parallel to the said planar bottom, spaced-apart, parallel, sidewalls extending vertically upwardly from the said overhanging surfaces and terminating at the said top surface of said driving end and whereby a substantially rectangular shaped opening in the top surface of the driving end is provided of a predetermined lesser width than the width of said bottom; and (b) a driving tool for providing rotational motion to said fastener comprising a shank, a blade at the operative end of the shank comprising opposing converging planar faces terminating at a bit of an inverted generally T-shaped cross-section for operative association with the nick in the said fastener, said bit comprising a planar bottom surface of rectangular shape for engagement during operative association with the planar bottom of the nick, spaced-apart parallel planar sides extending vertically upwardly from the said planar bottom surface, planar upper surfaces extending inwardly toward one another and terminating at respective converging faces of said blade, said upper surfaces each diverging upwardly and equally with respect to the planar bottom surface of the bit, the bottom rectangular shaped surface of said bit being of sufficiently lesser width than the rectangular shaped opening provided in the nick as to allow the bit to be inserted axially into and to pass through said rectangular shaped opening, and the vertical dimensions of said first named spaced-apart sidewalls of the nick with respect to the vertical dimension of the parallel sides of the bit being such that, on rotation of the bit with respect to the nick in the fastener, in operative association of the driving tool blade in the fastener nick, the diverging upper surfaces of the bit will pass under and into jamming contact with upper respective overhanging surfaces of the nick whereby temporary, wedging engagement between the driving tool and fastener is provided and the fastener can be presented to or withdrawn from a workpiece in any desired orientation and without becoming accidentally separated from the driving tool.

* * * * *